Sept. 17, 1968     J. E. CIRCLE     3,401,733
ANCHOR BOLT STRUCTURE
Filed Sept. 12, 1966     3 Sheets-Sheet 1
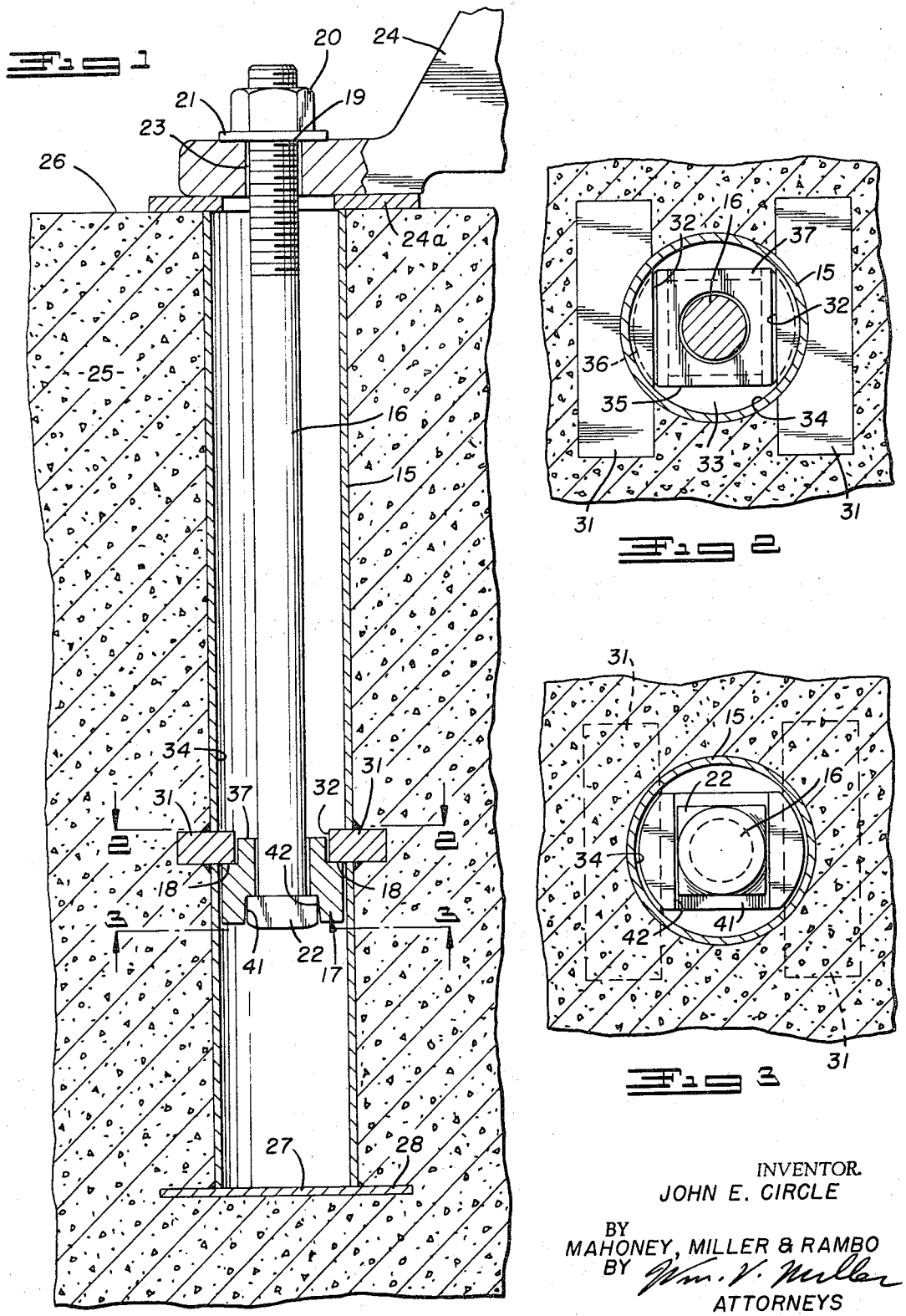
INVENTOR.
JOHN E. CIRCLE
BY MAHONEY, MILLER & RAMBO
BY
ATTORNEYS

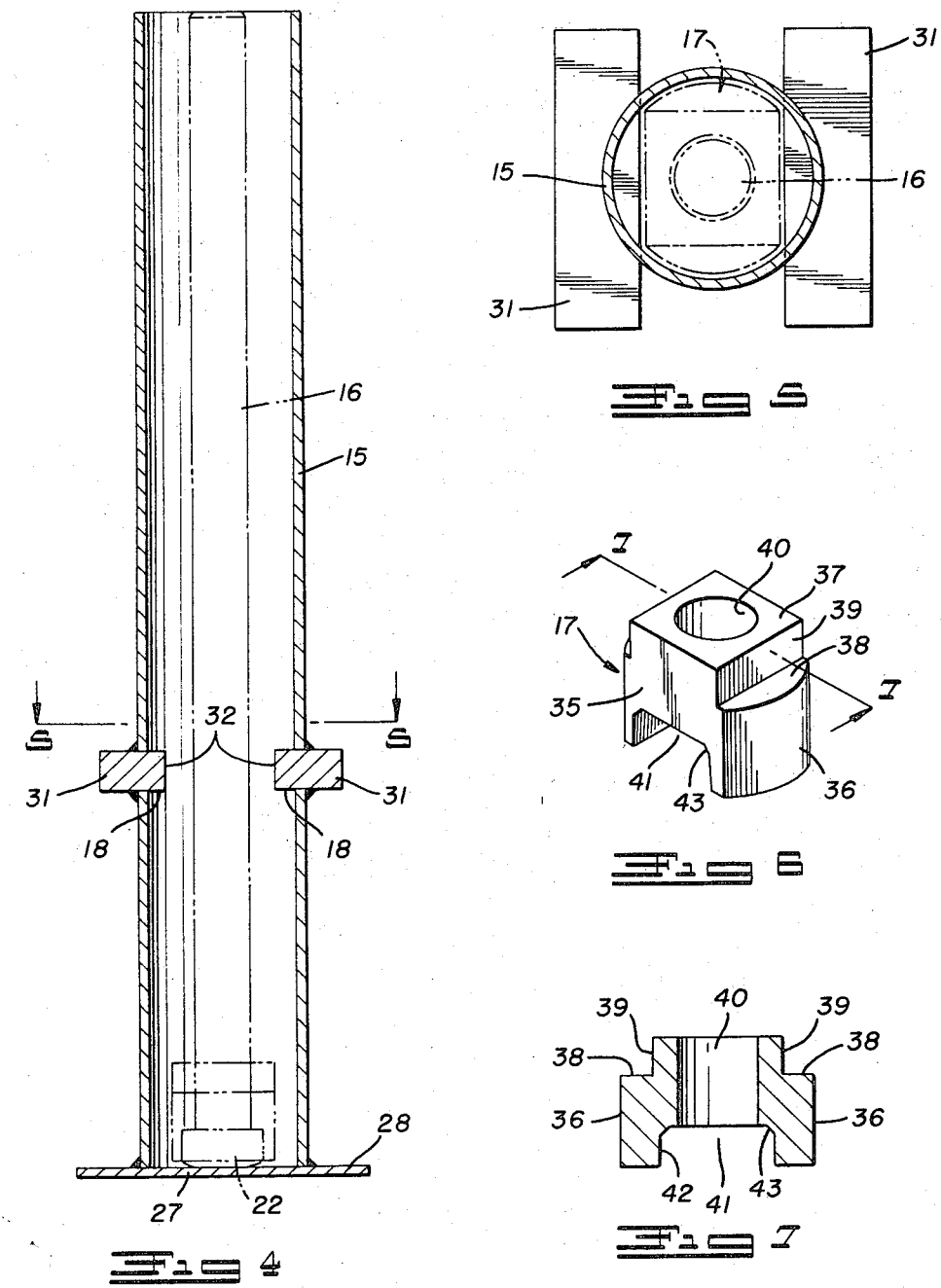

Sept. 17, 1968  J. E. CIRCLE  3,401,733
ANCHOR BOLT STRUCTURE
Filed Sept. 12, 1966  3 Sheets-Sheet 3
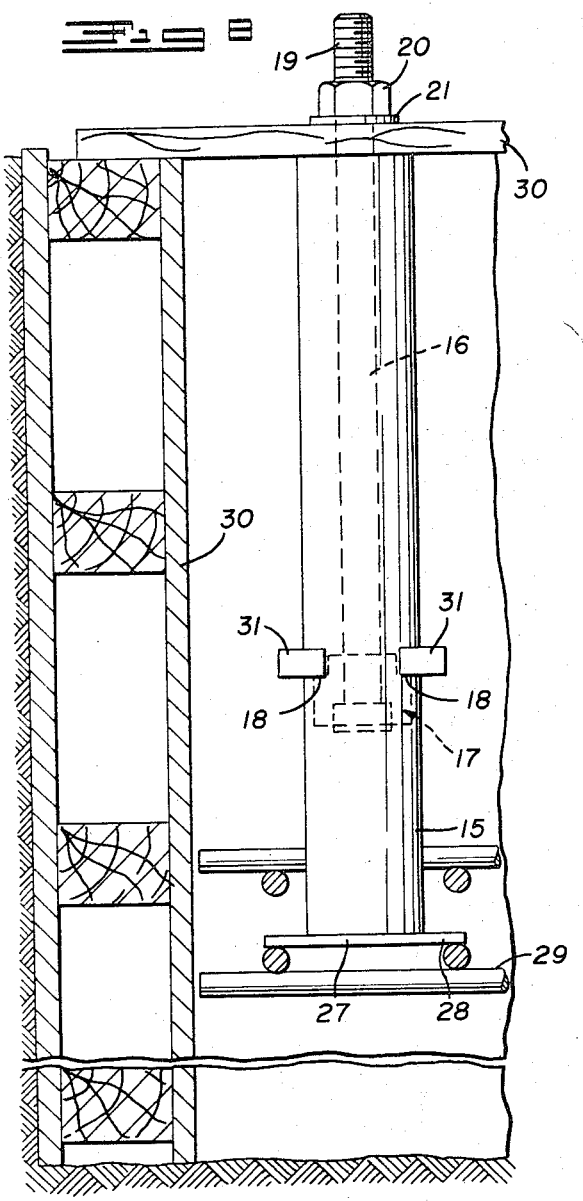
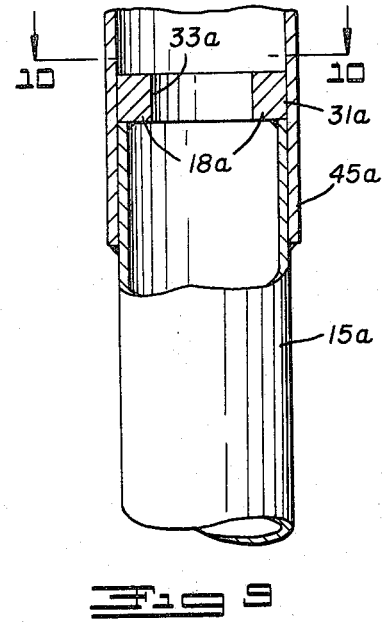
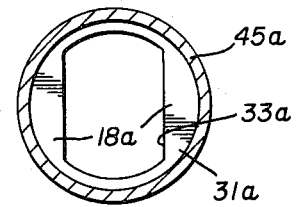
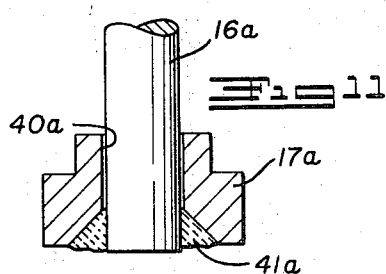
INVENTOR.
JOHN E. CIRCLE
BY
MAHONEY, MILLER & RAMBO
BY
ATTORNEYS United States Patent Office 3,401,733
Patented Sept. 17, 1968

3,401,733
ANCHOR BOLT STRUCTURE
John E. Circle, 187 Sinsbury Drive N.,
Worthington, Ohio 43085
Filed Sept. 12, 1966, Ser. No. 578,860
5 Claims. (Cl. 151—41.76)

ABSTRACT OF THE DISCLOSURE

An anchor bolt arrangement which is particularly useful for anchoring heavy machinery to bases or floors, such as concrete floors, but which is not necessarily limited thereto and which includes mainly an anchoring member, adapted to be embedded in the floor, and a bolt or stud adapted to be connected to that member in a novel manner.

Objects of the invention

It is the main object of this invention to provide a simple, rugged, effective yet low-cost anchor bolt arrangement in which the bolt or stud is connected to an anchoring member for limited axial movement for insertion and fixing to the base of machinery and in which the connection permits lateral adjustment relative to the anchoring device so as to align with openings in the base of the machinery, which can be tightened readily to clamp the machinery to the floor effectively, and which can be dropped in the anchoring member to a position flush with or below the machinery-supporting surface when it is released from the machinery, for example, to permit removal of the machinery.

Another object of this invention is to provide an anchor bolt arrangement which uses a long shank bolt under tension which can stretch and shrink with machinery and foundation vibrations with relatively minor change in hold-down force as compared to shorter bolts which may pull in two due to a high deformation per unit length from forces such as harmonic vibration raising the machinery from the foundation. The use of longer bolts provides relative uniform hold-down pressure without overloading the anchoring member, the bolt, or the machinery base. Such uniform hold-down pressure prevents side creep and machinery misalignment and the working loose of nuts, shims, and adjustable supports. This feature is also important in rotating machinery that may operate with a small amount of vibration but can pass through harmonic modes in gaining or losing speed which must be dampened by mass foundations.

Another object of this invention is to provide an anchor bolt arrangement which will result in the concrete foundation being in compression for approximately the same depth as the anchor bolt arrangement and which provides many advantages, one of which is post-tensioning of the concrete which allows machinery vibrations to vertically displace the anchor point with relative uniform support pressure. This uniform hold-down pressure transmits maximum vibration energy to the mass concrete foundation where it is best absorbed with minimum damage to the machinery.

Still another object of this invention is to provide an anchor arrangement using an anchor member that is easy to position in concrete foundation reinforcing and easy to secure by wiring or welding to such reinforcing. Also, tension forces are easily transmitted to the reinforcing steel even to the bottom mat-type reinforcing steel.

A further object of this invention is to provide a hollow anchor member that, if desired, may be filled with a liquid that sets to a solid, such as concrete grout, lead, sulfur, etc. to positively secure the anchor bolt from lateral movement after the machinery is anchored in place.

Another object of this invention is to provide an anchor bolt arrangement in which the bolt or stud can be readily removed and replaced if damaged.

Another object of this invention is to provide an anchor bolt arrangement in which the bolt or stud used can be of a standard or common type eliminating the need for specially designed bolts.

Various other objects and advantages will be apparent.

According to this invention, there is provided an anchoring member which is embedded in the concrete base or other machinery-supporting base. This member is of sleeve-like form with its upper end open and accessible from the supporting surface for vertical insertion and removal of the anchoring stud or bolt. At a point intermediate its height, the anchoring sleeve is provided with an elongated slot extending diametrically thereof, the slot being of less width than length to provide stop shoulders at each side thereof which project inwardly from the wall of the sleeve. The anchor bolt has a retaining lug nonrotatably mounted at the head end thereof which has a stop portion that extends diametrically thereof and is of such a width that it can drop through the slot, if properly aligned therewith, and of such a length that if then rotated angularly at a right angle about the axis of the bolt, it will extend transversely across the slot and engage beneath the inwardly projecting stop shoulders to thereby prevent upward axial withdrawal movement of the anchor bolt from the sleeve. Also, the lug preferably has a portion which interfits with the slot to prevent rotation of the lug relative to the sleeve. At this time, the threaded upper extremity of the anchor bolt will project outwardly from the sleeve and can be aligned with and positioned in the proper anchoring opening in the machinery.

The accompanying drawings illustrate preferred embodiments of this invention but it is to be understood that these are by way of example only and the invention can take other specific forms.

In these drawings:

FIGURE 1 is a vertical sectional view showing the anchoring bolt structure in use.

FIGURE 2 is a horizontal sectional view taken along line 2—2 of FIGURE 1.

FIGURE 3 is a horizontal sectional view taken along line 3—3 of FIGURE 1.

FIGURE 4 is a vertical or axial sectional view through the anchoring pedestal sleeve which is to be embedded in the concrete floor or other supporting base for the machinery.

FIGURE 5 is a horizontal sectional view taken along line 5—5 of FIGURE 4.

FIGURE 6 is a perspective view of the separate bolt head-engaging retaining lug member.

FIGURE 7 is a sectional view taken along line 7—7 of FIGURE 6 through the retaining lug member.

FIGURE 8 is a diagrammatic view illustrating the manner of installing the pedestal sleeve in a concrete base.

FIGURE 9 illustrates a variation of the anchoring pedestal sleeve.

FIGURE 10 is a sectional view taken along line 10—10 of FIGURE 9 showing the stop collar used in the pedestal of FIGURE 9.

FIGURE 11 is a detail illustrating the retaining lug permanently fixed on one end of an anchor member which is in the form of a threaded rod.

With particular reference to the drawings, in FIGURE 1 there is illustrated the assembled anchoring bolt structure and its function. It comprises generally a tubular or sleeve-like pedestal anchoring member 15, a cooperating stud bolt 16, preferably of standard form, and a retaining or stop lug member 17 mounted on the head end of the bolt and engaging beneath a pair of opposed shoulders 18 disposed inwardly of the sleeve-like pedestal member 15 at a level intermediate the height of that member. The upper end of the bolt 16 is shown threaded at 19 for receiving at least one cooperating threaded nut 20 and one or more associated washers 21. The lower end of the bolt has the usual head 22 which nonrotatably interfits with the lug member 17 and the upper end of the bolt is adapted to extend upwardly through an opening 23 in the base 24 of a machine adapted to be clamped or anchored to a base 25 which is indicated as a poured concrete floor with an upper exposed flat surface 26.

The pedestal member 15, as shown in FIGURES 1–4, may be formed of a suitable length of steel pipe or the like having a plate or disc 27 preferably welded to its lower end and preferably of greater diameter to form an outwardly projecting peripheral anchoring flange 28. Assuming this member 15 is to be embedded in the concrete floor 25, this can be accomplished as indicated in FIGURE 8 where the entire assembly is suspended from a horizontal strip 30 that, in turn, is supported from the side form. The member 15 is suspended by means of the bolt 16 with the washer 21 thereon resting on the strip 30 around a bolt-receiving opening formed therein. The pedestal 15 may be supported in this manner, preparatory to pouring the concrete around it, to locate it in a preselected position. The flange 28 may be hooked beneath the reinforcing mat 29 or wired or welded to the mat or other type of reinforcing. Many other methods of installation may be used.

The shoulders 18 on the interior of the sleeve-like pedestal member or sleeve 15 may be easily formed, as indicated in FIGURES 1 and 2, by cutting horzontal slots, or slots transversely at right angles to the sleeve axis, at opposite sides of the sleeve and positioning and welding therein the transversely extending bars 31. These bars project horizontally and laterally into the interior of the sleeve and also project laterally outwardly so that their outer edges are beyond the outer diameter of the sleeve. Their ends also project outwardly from the sleeve so that these projecting ends as well as the outwardly projecting edges serve to provide additional anchoring portions for the sleeve to be embedded in the concrete. The inner edges 32 of the bars 31 extend chordally of the inner surface of the sleeve in parallel spaced relationship to provide a slot 33 therebetween (FIGURE 2) which is of greater length than width, has the sides formed by the parallel bar edges 32 and the ends 34 formed by the curved inner surface of the sleeve-like pedestal 15.

The bolt 16 is an elongated bolt preferably of standard form with the head 22 at its lower or inner end of the common square or hex contour. The upper or outer end, as previously indicated, has the usual threaded shank 19 for receiving the nut 20.

The lug member 17 is preferably a separate member with a body which, in transverse cross section, is complemental to the slot 33 in the sleeve pedestal 15. This elongated body, as shown best in FIGURES 6 and 7, has the opposed spaced parallel vertical or upright side edges 35 and the curved ends 36. In addition, it has a square locking nut portion 37 formed on its upper side which has a horizontal or transverse dimension just slightly less than the width of the slot 33. This forms the horizontally disposed bands or stop shoulders 38 between the nut portion 37 and the curved ends 36, and also forms the vertical locking shoulders 39 on the member 17 normal to the band surfaces 38. The lug has a smooth vertical bore 40 centered therein through which the shank of the bolt 16 is adapted to slidably pass. Formed in the lower side of the member 17 is a transverse locking slot or socket 41 which is of a width just slightly greater than the transverse dimension of the square or hex head 22 of the bolt and has the straight upright parallel sides 42, preferably with converging tapers 43 at their upper corners so as to tighten up on the bolt head 22.

When the lug member 17 is dropped onto the bolt 16 with the socket 41 downwardly, the member will slide down on the shank of the bolt until it strikes the head 22 of the bolt. If necessary, it can be rotated slightly to cause the head 22 to be positioned upwardly within the complemental socket 41 so that the head 22 and lug member 17 will interfit and lock to prevent relative rotation, as indicated best in FIGURE 3, where the edges of the head 22 are shown cooperating with the sides 42 of the socket 41.

The assembly can now be lowered into the pedestal member 15. If the assembly is rotated to align the lug member 17 with the slot 33, the member 17 may pass downwardly through the slot and below the locking shoulders 18. Now, by rotating the shank of the bolt 16, the member 17 can be rotated to swing the locking bands or shoulders 38 beneath the locking shoulders 18. Any upward pull on the bolt will now bring the shouldered surfaces 18 and 38 into firm engagement. Also, the square nut portion 37 on the member 17 will be brought up into the slot so that the shoulder surfaces 39 thereof will cooperate with the sides of the slot 33 to prevent rotation of the bolt 16 relative to the lug member 17 and the pedestal member 15, as indicated best in FIGURE 2. At this time, the bolt 16 will project upwardly from the sleeve pedestal 15 and may have been inserted in the opening 23 in the base 24 of the machine. The upper end of the bolt 16 can be swiveled, even though it is anchored at its lower end in the pedestal 15, to align it with the opening 23. Also, at any time, after removal of the nut 20, it may be dropped into the pedestal, as indicated by broken lines in FIGURE 4, until its upper end is below the upper end of the sleeve pedestal 15 and, therefore, below the surfaces 26 of the floor. The pedestal 15 being a sleeve with a closed end provides a container which can receive material in liquid form which will set as a solid to positively secure the bolt 16 from a lateral movement after it is in its desired position. This material may be concrete, paint, lead, sulfur, etc. However, it is used only when it is not desirable to drop the bolt in the pedestal to a flush or below flush position. It is preferred that shims 24a be placed on the concrete surface 26 under the base 24 and the resulting spaces will permit the pouring of the liquid into the upper open end of the member 15.

The anchoring pedestal may be made in other ways, for example, as indicated in FIGURES 9 and 10. In this case, the slot 33a will be formed in a metal collar 31a to provide the opposed shoulders 18a. This collar may then be welded on the upper end of the pedestal 15a. If desired, this member 15a may have a sleeve extension 45a slipped over its upper end and enclosing the collar and this sleeve 45a may be welded to the sleeve-like pedestal 15a. This arrangement will cooperate with the bolt and lug assembly exactly as before.

It is perferred that a standard bolt 16 be used, as indicated, but if desired, as indicated in FIGURE 11, the bolt and lug assembly may be made as an integral unit. Thus, the shank 16a may be slipped into the bore 40a of the lug member 17a and be welded therein as indicated at 41a. The resulting assembly will have the lug member 17a fixed on the bolt shank 16a both axially and angularly. However, it will otherwise function the same as the assembly previously described where the member 17 is separate from the bolt 16.

The long shank of the bolt 16 is desirable so that it can stretch and shrink as compared to shorter bolts which may pull in two as previously indicated. With the use of this invention, the concrete foundation will be in compression for approximately the same depth as the anchor length which will result in the advantages previously mentioned. Uniform hold-down pressure and minimum interference with the concrete reinforcing steel will result from the use of this invention.

Other advantages will be apparent.

Having thus described this invention, what is claimed is:

1. An anchor bolt assembly for anchoring heavy machinery or other objects to the upper supporting surface of a floor or the like comprising an elongated stud bolt having a longitudinal axis and a shank with an enlarged head anchoring end and an opposed threaded end adapted to be attached to the machinery or other object, said head end including a retaining lug non-rotatable relative to said longitudinal axis, said retaining lug having an anchoring body which has lesser and greater transverse dimensions at right angles to each other about said longitudinal axis and a locking portion located axially inwardly of said anchoring body, wherein the transverse dimension of said locking portion which is parallel to the lesser transverse dimension of said anchoring body is less than that of said anchoring body to define a pair of spaced, substantially flat parallel surfaces; an elongated anchoring sleeve having a longitudinal axis and an end with an opening substantially larger than the cross-sectional dimension of said bolt shank and said retaining lug and adapted to be embedded in said floor with its said end uppermost and flush or below said surface and adapted to receive the bolt by passing its head end with the retaining lug downwardly through said opening, said sleeve having an axial extent at least as great as that of said bolt so that when the bolt is dropped therein with the head end lowermost in the sleeve, the other end will be flush with or below said supporting surface, said sleeve having inwardly projecting locking shoulders located axially inwardly a substantial distance from said other end which provide a slot therebetween which is of greater transverse length than width and the width being greater than the lesser transverse dimension of said lug but lesser than the greater dimension of said lug and the length being greater than the greater transverse dimension of said lug so that upon proper alignment the retaining lug may be passed downwardly through said slot and beneath said shoulders and then, if rotated, the anchoring body portion thereof will extend across said slot and beneath said shoulders to prevent upward withdrawal of the bolt from said anchoring sleeve but the locking portion thereof will pull upwardly into the slot, and the substantially flat surfaces thereon will interlock with the slot to prevent rotation of the bolt shank about said sleeve axis, said upper end of the shank of the bolt projecting through said sleeve opening above said surface when the said locking portion of the retaining lug is interlocked in said slot and being free to swivel in said sleeve opening for aligmennt with attaching means on the machinery or object to be anchored to said surface.

2. An anchor bolt assembly according to claim 1 in which the head end of the bolt includes an enlarged head integral with the shank and the retaining lug is a separate member having a bore through which the bolt shank slidably and rotatably passes, said lug and head having interlocking portions to prevent relative rotation.

3. An anchor bolt assembly according to claim 1 in which said sleeve has bars extending chordally thereof and fixed in opposed horizontal slots therein in spaced parallel relationship to provide the said slot therebetween, portions of said bars extending externally of said sleeve so that they will be anchored in the material of the floor.

4. An anchor bolt assembly according to claim 2 in which the anchoring body of the retaining lug is substantially complemental to the said slot provided between said locking shoulders on the sleeve, said bolt being a standard bolt and the head on the shank thereof being an angular head which is received in an outwardly opening socket in the body of said lug, said socket providing the portions which interlock with said angular head, said locking portion of the lug being angular and of lesser area than the body portion of the lug to provide shoulders for engaging said locking shoulders of the sleeve, said locking portion of the lug interfitting with the slot to prevent rotation therein.

5. An anchor bolt assembly according to claim 4 in which said outwardly opening socket has inwardly converging sides in which said angular bolt head will wedge.

References Cited

UNITED STATES PATENTS

| 909,769 | 1/1909 | Downing et al. | 52—711 |
| 2,988,855 | 6/1961 | Asfour et al. | 151—69 |
| 3,095,672 | 7/1963 | Di Tullio et al. | 151—41.76 |

FOREIGN PATENTS

| 983,089 | 2/1951 | France. | |

CARL W. TOMLIN, *Primary Examiner.*

R. S. BRITTS, *Assistant Examiner.*